Nov. 29, 1960 G. B. WHITE 2,962,119
FILTER UNIT
Filed July 8, 1957
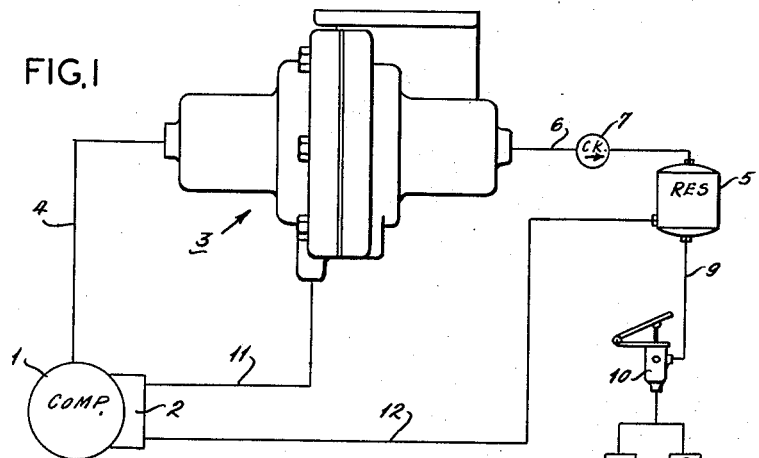
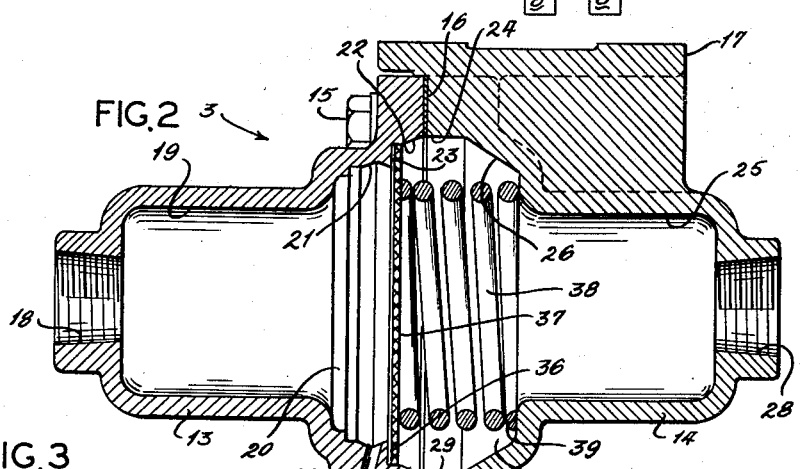
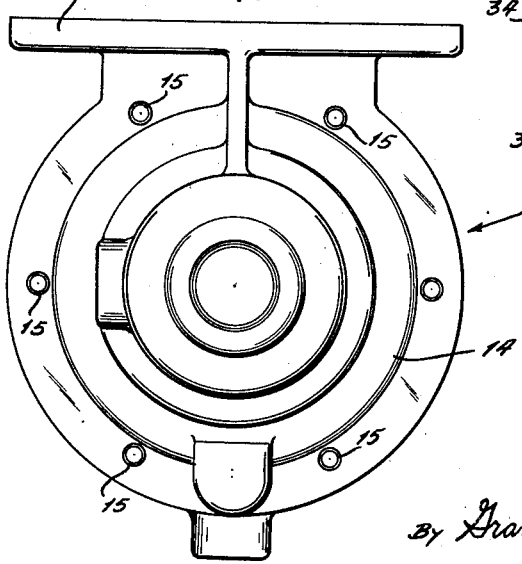
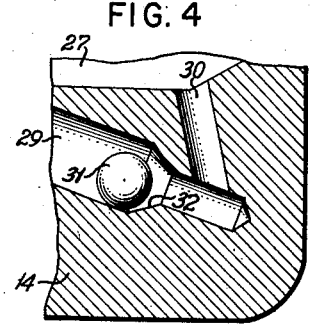
INVENTOR:
GERALD B. WHITE
By Gravely, Lieder, Woodruff & Wille
ATTORNEYS.

United States Patent Office 2,962,119
Patented Nov. 29, 1960

2,962,119

FILTER UNIT

Gerald B. White, Petersburg, Va., assignor to Wagner Electric Corporation, St. Louis, Mo., a corporation of Delaware Filed July 8, 1957, Ser. No. 670,543

10 Claims. (Cl. 183—42)

This invention relates in general to filters and in particular to filters for compressed air systems such as used on automotive vehicles and the like.

In the past, as air was compressed by a compressor, the lubricating oil of said compressor was mixed with said air in the form of minute droplets and also in the form of a mist or fog. The minute droplets of oil were separated from the air-oil mixture by centrifuging said mixture and/or employing a tortuous discharge path through a plurality of baffles; however, the oil mist remained suspended in the mixture. This undesirable carry over of oil mist in the mixture not only created an oil consumption problem in the compressor which impaired the efficiency thereof, but also resulted in an excessive accumulation of oil in the various valves and actuating units which deteriorated the rubber elements therein.

One of the principal objects of the present invention is to provide a filter unit having a porous filter therein which satisfactorily separates oil mist from an air-oil mixture.

Another object of the present invention is to provide a filter unit in a compressed air system in which the separated oil is returned to the compressing means.

Still another object of the present invention is to provide a filter unit having a porous filter therein which, when clogged, will not obviate the flow of compressed air through said filter unit.

These and other objects and advantages will become apparent hereinafter.

Briefly, the invention is embodied in a filter seated in an air passage by spring means in order to separate oil mist from the air-oil mist flow through said passage and movable from said seat against the compressive force of said spring to obviate flow restriction if said filter becomes clogged with oil sludge and/or foreign particles. In addition, means are also provided to return the separated oil to the compressing means.

The invention also consists in the parts and in the arrangements and combination of parts hereinafter described and claimed. In the accompanying drawing which forms a part of this specification and wherein like numerals refer to like parts wherever they occur:

Fig. 1 is a schematic view of a compressed air system having a filter unit therein embodying the present invention, Fig. 2 is a sectional view showing a preferred embodiment of the filter unit in cross-section, Fig. 3 is an end view of the filter unit looking at the outlet end, and Fig. 4 is a greatly enlarged fragmentary sectional view showing the valve means of the filter unit.

Referring now to the drawings in detail, a compressed air system is illustrated comprising an air compressing means 1 having the discharge or pressure side and the inlet or sub-atmospheric side controlled by a governor or control valve 2, as well known in the art. The discharge side of the compressor 1 is connected to the inlet of a filter unit 3 by a conduit 4 while the outlet thereof is connected to an air reservoir 5 by a conduit 6, said conduit 6 having a uni-directional flow valve 7 interposed therein. The reservoir 5 is connected to power cylinders or brake operating cylinders 8 by a conduit 9 with an application valve 10 positioned therebetween. To complete the system, a conduit 11 connects a drain port in the filter unit 3 with the inlet side of the compressing means 1 through the control valve 2, and another conduit 12 is interposed between the compressor control valve 2 and the storage reservoir 5.

The filter unit 3 comprises a left and right housing 13 and 14, respectively, which are sealably connected by suitable means, such as studs 15, having a gasket 16 interposed therebetween; and, said housing 14 is provided with an integrally formed mounting flange 17.

The housing 13 is provided with an inlet 18 which receives the conduit 4, as previously mentioned, and is axially aligned with a bore 19, an oil collection chamber 20 having a V-shaped undercut 21 in the side wall thereof, and a counterbore 22. A shoulder 23 formed between the chamber 20 and counterbore 22 serves as a seat for a filter which will be fully described hereinafter. A counterbore 24, having a side wall which is radially co-extensive with that of the counterbore 22, is provided in the housing 14 and is axially aligned with a bore 25 having a tapered shoulder 26 therebetween, said shoulder and counterbores 22 and 24 forming another oil collection chamber 27. An outlet 28 axially extends through the right end wall of the housing 14 and receives the conduit 6, as previously mentioned.

A stepped passage 29 is angularly positioned in the lower extremities of the housing 14 having the smaller portion thereof connected to the oil collection chamber 27 by another passage 30 while the larger portion intersects the end wall of said housing. The abovementioned angularity of the stepped passage 29 allows a ball-type check valve 31 which is rollable in the larger portion of said stepped passage to normally roll into juxtaposition with a shoulder 32 which is formed in said stepped passage serving as a cooperating seat for said valve 31, Fig. 4. A cross passage 33 in the housing 13 has one end connected to the undercut 21 of the chamber 20 by a passage 34 while the other end thereof intersects the end wall of said housing to connect with the stepped passage 29, said cross passage and stepped passage being misaligned to retain the rolling-ball-type check valve 31 against displacement from said stepped passage. The cross passage 33 is also intersected near the leftward end thereof by a drain port 35 which receives the conduit 11, as previously mentioned.

An annular seal or gasket 36 is positioned in abutment with the shoulder or seat 23, and a disc-shaped filter 37, such as a sintered metal filter of an iron-copper composition, is normally biased into sealable engagement with the seal 36 by the compressive force of a spring 38 interposed between said filter and a shoulder 39 adjacent to the sloping shoulder 26. Further, the filter 37 should be porous enough to allow a substantially unrestricted air flow therethrough.

In operation, it is important to consider the compression cycle of the compression means 1 which functions under two conditions, both of which are regulated by the compressor control valve 2 in response to the pressure in the reservoir 5, as well known in the art. The first condition is the "on" cycle when the pressure in the reservoir 5 is less than a predetermined minimum amount whereby the control valve 2 causes the compressor 1 to supply a compressed air-oil mixture to the system through the discharge or pressure side thereof while normally interrupting communication between inlet or sub-atmospheric side of the compressor 1 and the conduit 11. The second condition is the "off" cycle when the pressure in the reservoir exceeds a predetermined maximum amount. In this condition, the compressor 1 is idling, or not compressing air, whereby the inlet side thereof creates a partial vacuum and is placed in communication with the conduit 11 while the pressure side is vented to the atmosphere.

When the compressing means 1 is functioning in the "on" cycle, a compressed air and oil mixture is discharged therefrom into the conduit 4, said oil being in a mist or fog form, as previously discussed. This mixture flows into the unit 3 via the inlet 18 and therefrom into the bore 19 and chamber 20. When the mixture flows through the filter 37, the minute filtering passages therein separate the oil mist from the mixture and form oil droplets which ultimately fall into the chamber 20 and/or chamber 27. In other words, the particles of oil forming the oil mist are condensed, or squeezed together, by the abovementioned minute passages through the sintered metal filter 37 to form oil droplets. In this manner, a substantially unrestricted flow of compressed air passes through the filter 37 to be cleansed of the oil mist, as abovedescribed. The compressed air then flows through the chamber 27, the bore 25, and the outlet 28 of the unit 3 into the storage reservoir 5 via the conduit 6 and check valve 7.

The separated oil, in the form of droplets, falls into oil collection chambers 20 and 27 and drains into the passages 34 and 30, respectively, and therefrom via the stepped passage 29 and cross passage 33, and the drain port 35 into the conduit 11; however, this gravity type of draining from chambers 20 and 27 is incidental to the actual function of the filter unit 3, as will be apparent hereinafter.

When the pressure in the system reaches a predetermined maximum, the compressing means ceases compressing, or reverts to the "off" cycle. Upon cycling, the inlet or sub-atmospheric side of the compressing means 1 is placed in communication with the conduit 11, as previously mentioned; and, simultaneously therewith, the filter unit 3 is vented to atmosphere via the inlet 18, the conduit 4 and the pressure side of said compressing means. The uni-directional check valve 7 maintains the pressure in the storage reservoir 5. In this manner, it is apparent that a pressure differential exists between the conduits 4 and 11, and consequently, between the chambers 20 and 27 of the filter unit 3 and the drain port 35. Therefore, this pressure differential forces the separated or collected oil in the chambers 20 and 27 through the drain port 35 and back into the inlet side of the compressing means 1 via the conduit 11.

When the pressure in the storage reservoir 5 is depleted to a predetermined minimum by the operation of the application valve 10 to actuate the power cylinders 8 or by the use of various other devices (not shown) common to a compressed air system, the compressing means 1 will again cycle, or revert to the "on" cycle which destroys the abovementioned pressure differential, and a compressed air-oil mixture is again supplied to replenish the system.

If a situation arises wherein the filter 37 becomes clogged due to the presence of foreign particles in the air system or the decomposition of the oil to restrict or, in some cases, obviate the flow therethrough, a pressure differential is established across said filter. This pressure differential also prevails across the valve seat 32 in the stepped passage 29 acting on the effective area of the check valve 31 to sealably engage said check valve with said seat; therefore, with the valve 31 seated, the abovementioned pressure differential cannot force the separated oil in the chamber 20 through the stepped passage 29 and into the sysem. When the force of the pressure differential acting on the effective area of the filter 37 overcomes the compressive force of the spring 38 subsequent to the seating of the valve 31, said filter is disengaged from the seat 23 allowing the compressed air-oil mixture to flow thereby. In this manner, the filter 37 remains juxtaposed with or balanced from the seat 23 allowing a "leak by" mixture flow not only to obviate pressure starvation of the system but also to obviate the possibility of exploding the unit 3 due to excessively high pressures which could otherwise be trapped therein; and, the check valve 31 remains seated until the compressing means 1 reverts to the "off" cycle. Upon cycling, the spring 38 sealably re-engages the filter with the seat 23, and the oil in the chamber 20, is caused to flow back to the sub-atmospheric side of the compressing means 1, as previously described; however, the pressure of compressed air trapped in the housing 14 upon the reseating of the clogged filter 37 acts on the effective area of the check valve 31 creating a force to unseat said check valve. With the check valve 31 unseated, the pressure differential across the chamber 27 and the drain port 35 during the "off" cycle, as previously described, causes the separated oil to flow from said chamber back into the sub-atmospheric side of the compressing means 1.

Normal maintenance of a compressed air system provides for periodic draining of condensate from the storage reservoir, and a visual inspection of this condensate indicates whether the filter unit 3 is performing its function. When oil is present in the condensate, it is apparent that the abovementioned "leak by" condition prevails and the filter 37 is clogged; consequently, said filter can then be removed from the unit, cleaned, and re-inserted.

From the foregoing, it is obvious that the oil mist or fog in the compressed air-oil mixture discharged from the compressing means 1 is caused to condense when said mixture attempts to flow through the filter 37. In this manner, the condensation of the oil mist forms droplets of oil which collect in chambers 20 and 27 to ultimately be returned to the inlet side of the compressing means 1; and, the compressed air flows substantially unrestricted through said filter 37 into the storage reservoir 5.

It is readily apparent that the separated oil in chambers 20 and 27 is returned to the compression side of the compressing means 1. Upon reverting to the "off" cycle, the control valve 2 connects the pressure side of the compressing means 1 and consequently the conduit 4 to atmosphere, and the inlet or sub-atmospheric side thereof, is placed in communication with the conduit 11. In this manner, a pressure differential across the conduits 4 and 11, or across chambers 20 and 27 and the drain port 35, forces the collected oil in said chambers back into the inlet side of the compression means 1 via said conduit 11.

It is also readily apparent that clogging of the filter 37 does not obviate compressed air flow through the filter unit 3. When the filter 37 becomes clogged, a pressure differential is established thereacross which balances said filter from the seat 23 against the compressive force of the spring 38 thereby allowing a "leak-by" mixture flow into the reservoir 5 until the compressing means 1 reverts to the "off" cycle. This "leak-by" condition not only obviates pressure starvation of the system but also obviates the possibility of exploding the unit 3 due to excessively high pressure which might otherwise be trapped therein. Upon cycling, the pressure differential is destroyed allowing the spring 38 to reseat the filter 37.

It is now apparent that there has been provided a filter unit for separating oil mist from an air-oil mist mixture in a compressed air system which fulfills all of the objects and advantages sought therefor.

The foregoing description and accompanying drawing have been presented only by way of illustration and example, and changes and alterations in the instant disclosure, which will be apparent to one skilled in the art, are contemplated as within the scope of the instant invention which is limited only by the claims which follow.

What I claim is:

1. A filter unit comprising a housing having an inlet chamber connected with a pressure source, an outlet chamber connected with a reservoir, a seat formed in said housing between said inlet and outlet chambers, filter means positioned between said inlet and outlet chambers normally biased against said seat and adapted to unseat when a pressure differential between said inlet and outlet chamber exceeds a predetermined amount, passage means connecting said inlet and outlet chambers, a normally open valve in said passage means adapted to close off communication between said inlet and outlet chambers, and means connecting the passage means to the inlet side of said pressure source.

2. A filter unit comprising a housing having an inlet chamber connected to a pressure source, an outlet chamber, and a drain port, said housing having a seat between said inlet and outlet chambers, filter means positioned between said inlet and outlet chambers resiliently mounted against said seat and adapted to unseat when a pressure differential thereacross exceeds a predetermined amount, passage means connecting said inlet and outlet chambers with said drain port, and a normally open valve in said passage means adapted to be closed by a pressure differential across said filter means.

3. In a compressed air system including a compressor having a positive pressure output side and a negative pressure intake side, and a storage reservoir, a filter unit comprising a housing having inlet and outlet chambers connected to said positive pressure side and storage reservoir, respectively, a drain port connected with said negative pressure intake side having communication therebetween normally interrupted, filter means in said housing positioned between said inlet and outlet chambers, passage means connecting said inlet and outlet chambers with said drain port, and means controlling said compressor whereby said drain port is placed in communication with said negative pressure intake side and said positive pressure side is placed in communication with the atmosphere to create a pressure differential between each of said inlet and outlet chambers and said drain port.

4. In a compressed air system including a storage reservoir and a compressor having a positive pressure side and a sub-atmospheric pressure side, valve means connected with said storage reservoir and responsive to the pressure therein for controlling said compressor, and a filter unit comprising a housing having inlet and outlet chambers connected with said pressure source and storage reservoir, respectively, a drain port connected with said sub-atmospheric pressure side having communication therebetween normally interrupted by said valve means, a seat in said housing between said inlet and outlet chambers, filter means in said housing, means normally biasing said filter means against said seat, and passage means connecting said inlet and outlet chambers with said drain port, said valve means being adapted to place said positive pressure side in communication with the atmosphere and said drain port in communication with said sub-atmospheric pressure side to create a pressure differential between each of said inlet and outlet chambers and said drain port when the pressure in said reservoir exceeds a predetermined amount.

5. In a compressed air system including a compressor having a pressure side and a sub-atmospheric side, a storage reservoir connected with said pressure side to receive compressed air therefrom, said compressed air having compressor lubricating oil particles suspended therein, and valve means connected to said storage reservoir to control said pressure side and said sub-atmospheric side of said compressor in response to the pressure in said storage reservoir, means interposed between said compressor and storage reservoir adapted to separate said suspended oil particles from the compressed air flowing therethrough and to return the separated oil to said sub-atmospheric side, said means comprising a filter unit having a housing with an inlet and an outlet connected with said pressure side and said storage reservoir, respectively, a drain port connected with said sub-atmospheric side having communication therebetween normally interrupted, resiliently mounted filter means between said inlet and said outlet adapted to separate the suspended oil particles from the compressed air, a first and a second chamber on opposite sides of said filter means in communication with said inlet and outlet, respectively, said first and second chambers being adapted to collect the separated oil, and passage means connecting said first and second chambers with said drain port, said valve means being adapted to place said pressure side in communication with the atmosphere and said drain port in communication with said subatmospheric side to create a pressure differential between each of said first and second chambers and said drain port when the pressure in the storage reservoir exceeds a predetermined amount whereby said separated oil is returned to said sub-atmospheric side.

6. In a compressed air system including a compressor having a positive pressure side and a sub-atmospheric pressure side, a filter unit comprising a housing having inlet and outlet chambers, said inlet chamber being connected to said positive pressure side, a drain port connected with said sub-atmospheric pressure side and having communication therebetween normally interrupted, filter means in said housing positioned between said inlet and outlet chambers, passage means connecting said inlet chamber and said drain port, and control means for providing communication between said drain port and said sub-atmospheric pressure side to establish a pressure differential between said inlet chamber and drain port.

7. In a compressed air system, a filter unit comprising a housing having an inlet chamber, an outlet chamber, and a drain port, a storage reservoir, and a compressor having outlet and inlet sides and which functions periodically as a first pressure source and periodically as a second pressure source having a pressure less than that of said first pressure source, filter means in said housing positioned between said inlet and outlet chambers, passage means connecting said inlet and outlet chambers with said drain port, means connecting said drain port with said inlet side, and control means for said compressor normally interrupting communication between said drain port and said inlet side, said control means being responsive to a predetermined pressure in said storage reservoir to provide communication between said drain port and said inlet side of said compressor and establish a pressure differential between each of said inlet and outlet chambers and said drain port.

8. A filter unit comprising a housing having aligned chambers therein, a seat formed in said housing between said chambers, one of said chambers being connected with a pressure source, a drain port in said housing connected to said one chamber, a filter separating said chambers and movable in the other of said chambers, resilient means normally biasing said filter into engagement with said seat, said filter being responsive to a pressure differential thereacross above a predetermined amount to disengage from said seat against the force of said resilient means, passage means in said housing connecting said drain port and said other chamber, and a normally open check valve in said passage means, said check valve being responsive to a pressure differential across said filter to interrupt communication between said drain port and said other chambers.

9. A filter unit for a compressed air system comprising a housing having a first bore and an axially extending second bore therein, an annular shoulder formed in said housing between said first and second bores, an inlet port connecting said first bore with the output side of a compressor, an outlet port in said second bore, a disc-like filter in said second bore for engagement with said shoulder, spring means normally biasing said filter into engagement with said shoulder, said filter being movable from said shoulder against the force of said spring when a pressure differential between said first and second bores exceeds a predetermined amount, a drain port in said housing connected to the inlet side of said compressor, a first passage connecting said first bore with said drain port, a second passage connecting said second bore with said drain port, a valve seat in said second passage, and a normally open check valve in said second passage responsive to a pressure differential between said bores to engage said valve seat and close said second passage, thereby interrupting communication between said second bore and said drain port.

10. A filter unit for separating liquid from a compressed air-liquid mixture in a compressed air system comprising first and second housings, a first bore in said first housing having a first counterbore in axial alignment therewith, an annular seat formed by the shoulder between said first bore and first counterbore, a second bore in said second housing having a second counterbore in axial alignment therewith an inlet port in said first bore connected with a pressure source to receive said compressed air-liquid mixture, a filter in said first counterbore to separate the liquid from said compressed air-liquid mixture, a spring normally biasing said filter into engagement with said annular seat, said filter responsive to a pressure differential thereacross above a predetermined amount to unseat against the force of said spring, an outlet port in said second bore to discharge compressed air, a normally closed drain port in said first housing, flow passage means for said separated liquid connecting said first bore and second counterbore with said drain port, normally open valve means in said flow passage means between said drain port and second counterbore, said valve means responsive to said pressure differential to close said passage means between said second counterbore and drain port to prevent flow of said separated liquid therethrough.

References Cited in the file of this patent

UNITED STATES PATENTS

| | | |
|---|---|---|
| 1,450,561 | Parker | Apr. 3, 1923 |
| 2,016,541 | Campbell | Oct. 8, 1935 |
| 2,096,484 | Farmer | Oct. 19, 1937 |
| 2,134,413 | Munoz | Oct. 25, 1938 |
| 2,157,596 | Davis | May 9, 1939 |
| 2,244,919 | Peebles | June 10, 1941 |
| 2,419,664 | Tabbert | Apr. 29, 1947 |
| 2,537,094 | Schmidlin | Jan. 9, 1951 |
| 2,572,311 | Burd | Oct. 23, 1951 |
| 2,669,321 | Schmidlin | Feb. 16, 1954 |
| 2,739,605 | Smith | Mar. 27, 1956 |
| 2,840,183 | George | June 24, 1958 |

FOREIGN PATENTS

| | | |
|---|---|---|
| 303,763 | Great Britain | Jan. 4, 1929 |